E. ROSSITER.
PROCESS OF PRODUCING SULFUR DIOXID.
APPLICATION FILED DEC. 9, 1910.

1,039,812.  
Patented Oct. 1, 1912.

Witnesses:  
Charles J. Schmitt  
Nellie B. Dearborn

Inventor:  
Ernest Rossiter  
By Offield, Towle, Graves & Offield  
Attys.

UNITED STATES PATENT OFFICE.

ERNEST ROSSITER, OF PORT EDWARDS, WISCONSIN.

PROCESS OF PRODUCING SULFUR DIOXID.

1,039,812.  Specification of Letters Patent.  Patented Oct. 1, 1912.

Original application filed September 15, 1910, Serial No. 582,161. Divided and this application filed December 9, 1910. Serial No. 596,487.

*To all whom it may concern:*

Be it known that I, ERNEST ROSSITER, a resident of Port Edwards, in the county of Wood and State of Wisconsin, have invented a certain new and useful Process for Producing Sulfur Dioxid, of which the following is a specification.

My invention relates to an improved process for producing sulfur dioxid more efficiently and economically.

For the production of sulfur dioxid, sulfur is usually burned in the presence of air. In prior processes the sulfur is discharged into an oven and ignited, means being provided to agitate the sulfur and to mix air therewith during such burning, the product being sulfur dioxid ($SO_2$), this product being led away to be used for various purposes in various arts. However, the sulfur gas which is formed in the compartment in which the sulfur is agitated and burned will carry in suspension small solid particles of sulfur, and if this gas is drawn directly from the combustion chamber it will be more or less impure and not in the best and fittest condition for use for a great many purposes.

One object of my invention, is, therefore, to give the nascent sulfur gas a secondary combustion treatment in order to thoroughly burn all such sulfur particles in order to produce a gas which is entirely pure and which can be used to better advantage in the arts, such as in treating pulp in the paper manufacturing art.

Another object is to utilize the heat of the burning main body of sulfur for heating the gas during its secondary or purifying treatment.

Another object is to mix a sufficient quantity of air in the most efficient manner with the sulfur gas during the purifying period.

I shall first describe the apparatus for carrying out my improved process, whereafter this process will be more clearly understood.

In my co-pending application, Serial No. 582,161, filed September 15, 1910, claims covering apparatus and process for producing sulfur dioxid were submitted, and this present application may be considered as a divisional application in view of the Examiner's request to separate process claims from the apparatus claims. The apparatus described in this co-pending application I prefer to use for carrying out my improved process, although other suitable apparatus can be used. The apparatus of this co-pending application is therefore described herein, and in the accompanying drawings showing such apparatus—

Figure 1:
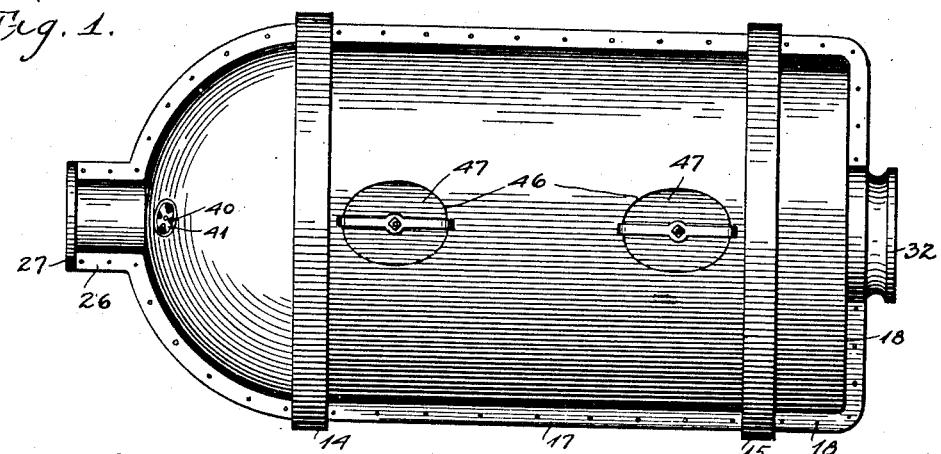
Figure 4:
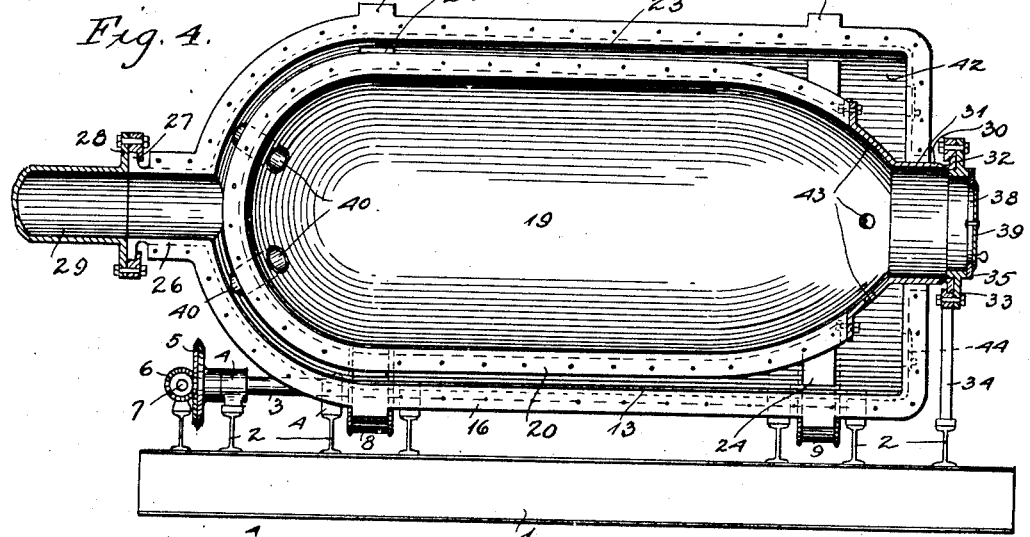
Figure 2:
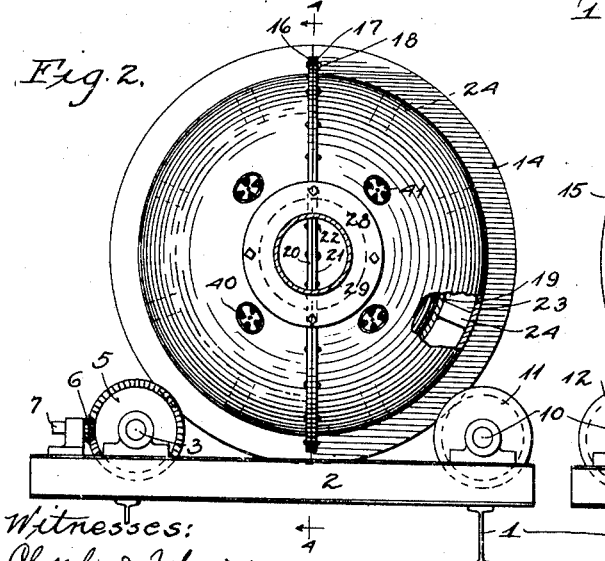
Figure 3:
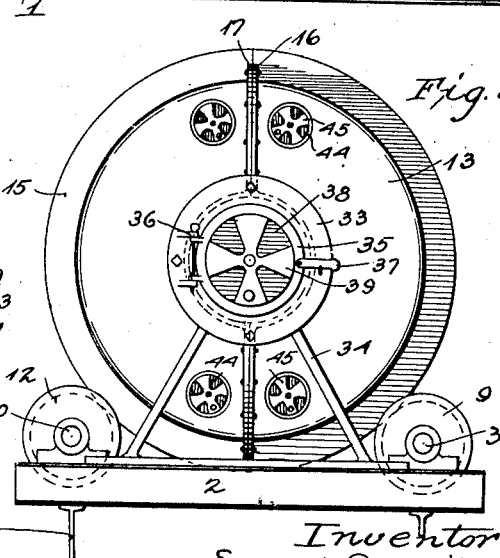

Figure 1 is a plan view of the apparatus, Fig. 2 is an end view of the outlet end, Fig. 3 is an end view of the other end, and Fig. 4 is a sectional view taken on plane 4—4, Fig. 2.

The supporting bed 1, which may be of a number of I-beams, carries a plurality of transverse members 2, which may also be I-beams, these transverse members supporting various bearings for the drive and drum supporting mechanism. As shown, the shaft 3 is journaled in bearings 4 and carries at one end a bevel gear 5 engaged by bevel pinion 6 on a drive shaft 7, which may be connected with a suitable driving source (not shown). Shaft 3 extends longitudinally along one side of and over the bed and carries rollers 8 and 9, while at the opposite side of the bed a shaft 10 is journaled and carries rollers 11 and 12, which are respectively transversely opposite the rollers 8 and 9. An outer drum or barrel 13 has annular bands or rails 14 and 15 engaging with rollers 8, 11 and 9, 12 respectively to thus support the drum 13 to be rotated upon rotation of shaft 3 by the driving source. The drum 13 may be constructed of two similar halves having peripheral flanges 16 and 17 connected together by suitable bolts 18. Within the outer drum 13 is the inner primary combustion drum 19 which may also be constructed of similar halves having peripheral flanges 20 and 21 connected together by bolts 22, the diameter of this inner drum being somewhat less than the diameter of the outer drum to leave an annular compartment 23, the inner drum having spacing lugs 24 extending therefrom in line with the bands 14 and 15 of the outer drum to space the drums apart. As shown, the left ends of the drums are semi-spherical, and the outer drum walls are extended near the axis to form the annular neck 26, which terminates in a flange 27 adapted to be connected to a flange 28 at the end of piping 29 with which a pump (not shown) is connected. The other end of the inner drum is contracted and terminates in a neck 30 which extends through the axial opening 31 in the corresponding end of the outer drum, this neck terminating in a flange 32 having bearing in an annular head 33 supported from the bed 1 by a standard frame 34. The entrance through this annular head is adapted to be closed by a door 35 hinged at 36 and having the latch 37, the door having segment openings 38 controllable by the rotatable damper 39 pivoted to the door. At the left end air inlet ducts 40 extend through and between the walls of the outer and inner drums and are controllable from the exterior by pivoted damper disks 41. The right end of the outer barrel remains cylindrical, so that between this end and the contracted end of the inner drum a compartment head 42 is formed for the annular chamber 23 between the drums. Through the walls of the inner drum are the passageways 43 for connecting the inner drum with the compartment 42. In the adjacent head of the outer compartment are air inlet openings 44 controlled by rotatable dampers 45. As shown in Fig. 1, the outer drum has also a plurality of cleaning manholes 46 which may be closed by covers 47.

Sulfur, usually in powdered form, is charged into the inner drum through the door 35, and the sulfur is ignited and the drums slowly rotated to tumble about and to thoroughly agitate the burning sulfur within the drum. The pump (not shown) connecting with the outlet pipe 29 is set in operation, and the suction effect thereof will cause air to be drawn through the air inlets 40, through the air inlets 38, if the damper 39 is open, and through the air inlets 44 to the annular compartment. The air flowing into the combustion drum flows longitudinally therethrough, and is thoroughly mixed and co-mingled with the burning sulfur as it is tumbled about and across the drum, so that sulfur dioxid is formed. The suction effect on the air inlet openings of the inner drum is by way of the outer compartment 23 and the communicating passageways 43 between the inner drum and said annular compartment, and the generated gas will be drawn through the passageways 43 into compartment 42 and through compartment 23 and out through the piping 29 to be delivered into a storage tank or to a place where it is desired to utilize the gas. The door 35 may be opened at any time to inspect the interior of the inner drum, and the damper 39 can be regulated to assist in supplying air to this drum, and ordinarily this damper is closed, so that the air supply to the inner drum will ordinarily be through the inlets 40. This air, flowing through the burning sulfur and through the unburned sulfur, will take on and hold in suspension unoxidized sulfur molecules, and if the gas were delivered for use directly from the inner drum it would be quite impure on account of the unoxidized sulfur therein and could not be used with the best results and the greatest efficiency. However, the impure nascent gas, before it can be delivered for use, must first circulate through the compartment 23 which intimately surrounds the hot inner drum containing the burning sulfur, and the gas passing through the compartment 23 is therefore given a secondary heating, and in the presence of sufficient air which, by force of the pump, is drawn through the properly regulated dampers 45 into the compartment 23 to be thoroughly mixed with the gas, so that the sulfur particles in the gas will be thoroughly burned and converted into sulfur dioxid and the delivered gas will therefore be of maximum purity and in the best condition for subsequent use in the various arts, as for example, in chemical pulp making in the paper manufacturing art. My process therefore involves the primary combustion of sulfur in one compartment, the thorough tumbling about and agitating of the burning sulfur in such compartment, the controllable supply of air into said compartment, the drawing off of the nascent impure gas from this compartment into a secondary compartment, the heating of the impure gas in this secondary compartment by the heat generated by the burning sulfur in the primary compartment, the controllable supplying of air into the secondary compartment, and the provision of suction means for in common causing the flow of air supply into the compartments and the delivery of the pure gas from the auxiliary or secondary compartment.

Having thus described my invention, I claim the following:

1. The process of producing sulfur dioxid, which consists in burning sulfur in a substantially closed compartment, thoroughly agitating the burning sulfur in contact with air whereby sulfur dioxid gas is formed, drawing from said compartment the sulfur gas as it is formed, utilizing substantially all the heat radiated by said compartment walls to further heat the drawn-off sulfur gas, and supplying to the gas during such further heating thereof air in amount sufficient to completely burn all the contained vaporized sulfur.

2. The process of producing sulfur dioxid, which consists in burning sulfur in a substantially closed compartment, thoroughly agitating the burning sulfur and supplying air thereto whereby sulfur dioxid gas is formed, drawing from said compartment the sulfur gas as it is formed, utilizing substantially all of the heat generated by the burning sulfur to further heat the drawn-off sulfur gas, and supplying to the gas during such further heating thereof air in amount sufficient to completely burn all the contained vaporized sulfur.

In witness whereof, I hereunto subscribe my name this 6th day of December, A. D. 1910.

ERNEST ROSSITER.

Witnesses:
J. E. BRYAN,
A. U. MARVIN.